United States Patent [19]

Nagate et al.

[11] Patent Number: 5,359,248
[45] Date of Patent: Oct. 25, 1994

[54] CORROSION RESISTANT ROTOR WITH AUXILIARY YOKES

[75] Inventors: Takashi Nagate; Kenichi Endo; Yoshikazu Koike; Takeshi Seto; Yoshihiko Yamagishi, all of Suwa, Japan

[73] Assignee: Seiko Epson Corporation, Tokyo, Japan

[21] Appl. No.: 39,066

[22] PCT Filed: Jul. 10, 1991

[86] PCT No.: PCT/JP91/00926

§ 371 Date: Apr. 8, 1993

§ 102(e) Date: Apr. 8, 1993

[87] PCT Pub. No.: WO92/07407

PCT Pub. Date: Apr. 30, 1992

[30] Foreign Application Priority Data

Oct. 12, 1990 [JP] Japan ................................. 2-273769
Nov. 9, 1990 [JP] Japan ................................. 2-304539

[51] Int. Cl.[5] .............................................. H02K 21/12
[52] U.S. Cl. ....................................... 310/156; 310/43; 310/261
[58] Field of Search ............... 310/156, 261, 218, 271, 310/54, 42, 43, 262, 85, 88, 89

[56] References Cited

U.S. PATENT DOCUMENTS

| 4,433,261 | 2/1984 | Nashiki | 310/156 |
| 4,445,062 | 4/1984 | Glaser | 310/156 |
| 4,631,435 | 12/1986 | McCarty | 310/156 |
| 4,674,178 | 6/1987 | Patel | 310/156 |
| 4,742,259 | 5/1988 | Schaefer | 310/156 |
| 4,930,201 | 6/1990 | Brown | 310/156 |
| 4,973,872 | 11/1990 | Dohogne | 310/156 |
| 5,140,210 | 8/1992 | Shirakawa | 310/156 |
| 5,233,248 | 8/1993 | Kawamura | 310/88 |

FOREIGN PATENT DOCUMENTS

| 0021525 | 6/1974 | Japan . |
| 0033482 | 9/1974 | Japan . |
| 0037898 | 4/1978 | Japan . |
| 0172376 | 11/1983 | Japan . |

*Primary Examiner*—R. Skudy
*Attorney, Agent, or Firm*—Kanesaka & Takeuchi

[57] ABSTRACT

A permanent magnet rotor (1) used in a corrosive atmosphere or liquid and provided with field permanent magnets (10) inserted into slots (9) of a lamination of silicon steel plates (2), wherein the outer surfaces of the field permanent magnets (10) are covered with anticorrosive plates made of an antiicorrosive material. The field permanent magnets (10) of the permanent rotor (1) can be used without being corroded, and the rotor (1) can be easily manufactured.

2 Claims, 9 Drawing Sheets

CORROSION RESISTANT ROTOR WITH AUXILIARY YOKES

TECHNICAL FIELD

The present invention relates to a brushless motor suitable for use in corrosive atmosphere or liquid, particularly in refrigerant, and more particularly to a rotor for such a brushless motor.

PRIOR ART

The permanent magnet rotor is well known, which generally comprises a yoke formed of a plurality of laminated silicon steel sheets and permanent magnets for field inserted into such a yoke.

Referring to FIG. 8 of the attached drawings, there is shown a permanent magnet rotor 50 of prior art which includes a yoke 51. The yoke 51 is formed of, as mentioned above, a plurality of integrally laminated silicon steel sheets 52 and has along its outer periphery four magnetic poles 53 projecting radially outward. The respective magnetic poles 53 are formed with slots 54 serving to respective field permanent magnets 55.

Now referring to FIG. 9, the above well known permanent magnet rotor 50 is shown in a sectional view. As seen, the permanent magnets 55 are inserted into the respective slots 54 of the yoke 51. These permanent magnets 55 are arranged so that the outer periphery of the permanent magnet rotor 50 are magnetized alternately in different polarities, as shown. Consequently, the permanent magnet rotor 50 has four magnetic poles. Magnetic flux generated from these magnetic poles interacts with electric current flowing through excitation coils (not shown) of the motor to drive the permanent magnet rotor 50.

However, the conventional permanent magnet rotor has been disadvantageous in that the fluid surrounding the permanent magnet rotor tends to permeate through interstices of the laminated steel sheets and comes in contact with the permanent magnets. Particularly in the case of the motor used in the scroll type compressor for the air-conditioner, the permanent magnets of the rotor have inevitably been corroded due to direct contact with the refrigerant resulting in serious problems, for example, a capacity of the motor has been reduced due to demagnetization of the magnets and parts of the equipment have been clogged with magnetic particles separated from the permanent magnets.

Moreover, the permanent magnets in the conventional permanent magnet rotor have usually been mechanically fragile and liable to be damaged during insertion into or bonding onto the yoke.

Accordingly, it is an object of the invention to provide a permanent magnet rotor which can be used without corrosion of permanent magnets and easily manufactured, on one hand, and to provide a method of making such a permanent magnet rotor, on the other hand.

DISCLOSURE OF THE INVENTION

The object set forth above is achieved in accordance with a first aspect of the invention, by a permanent magnet rotor comprising a yoke formed from a plurality of silicon steel sheets and permanent magnets inserted into respective slots axially extending through the yoke wherein the permanent magnets are hermetically covered with respective anticorrosive plates.

The object is also achieved by a method of making this permanent magnet rotor comprising steps of forming a peripheral wall of a mold having a rectangular crosssection from an anticorrosive plate, pouring molten metal of cast type permanent magnet and thereby molding a permanent magnet ingot, hot-rolling the permanent magnet ingot by a rolling mill, simultaneously the ingot being magnetically made anisotropic, into a rolled bar of permanent magnet having a predetermined cross-sectional dimension cutting the rolled bar of permanent magnet into an individual permanent magnet of a predetermined length, and inserting or bonding the individual permanent magnet into or onto the yoke.

The object set forth above is achieved in accordance with a second aspect of the invention by a permanent magnet rotor for brushless motor used in corrosive atmosphere or liquid, wherein a yoke and permanent magnets of the rotor are hermetically covered with a sheet of corrosion resisting material.

PREFERRED EMBODIMENTS OF THE INVENTION

The invention will be more readily understood from the following description of preferred embodiments made with reference to the attached drawings.

Figure 1:
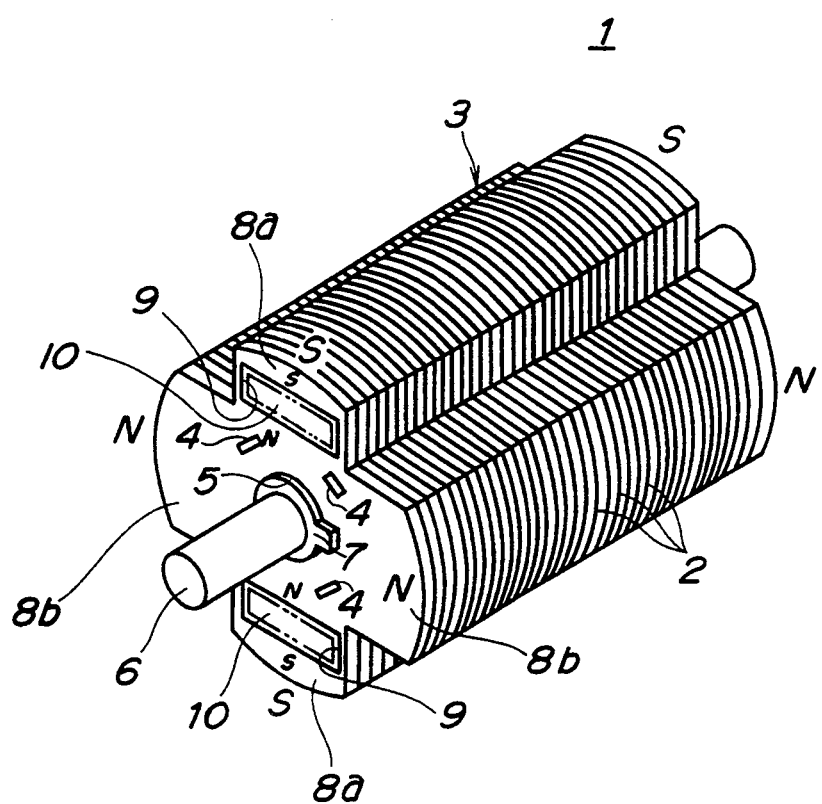
FIG. 1 is a perspective view showing an embodiment of permanent magnet rotor constructed in accordance with the invention.

Referring to FIG. 1, there is shown the first embodiment of the permanent magnet rotor constructed in accordance with the invention. The permanent magnet rotor 1 has a yoke 3 comprising a plurality of integrally laminated silicon steel sheets 2. Each of these silicon steel sheets 2 has a plurality of rectangular recesses 4 formed by pressing so that these silicon steel sheets may be put together into the yoke 3 by forcing the recesses 4 into engagement with one another . The yoke 3 is centrally formed with an opening 5 axially extending therethrough to receive a rotatable shaft 6 which has, in turn, a key 7 by means of which the rotatable shaft 6 is rotated integrally with the yoke 3. The yoke 3 has along its outer periphery four magnetic poles projecting therefrom radially outward and a pair of the magnetic poles 8a, 8a which are diametrically opposed to each other are provided with slots 9, respectively, destined to receive permanent magnets. The another pair of said magnetic poles 8b, 8b are provided with no slot. The slots 9 contain therein the permanent magnets 10, respectively.

The permanent magnets 10 are arranged to have their N-poles diametrically opposed to each other. The N-poles of the representative permanent magnets 10 repulse each other and, in consequence, the magnetic poles 8a, 8a are magnetized in S-polarity while the magnetic poles 8b, 8b are magnetized in N-polarity. Thus, the permanent magnet rotor 1 has along its outer periphery four magnetic poles arranged to have alternately different polarities and is rotationally driven by an interaction of these magnetic poles and electric current flowing through excitation coils (not shown).

Figure 2:
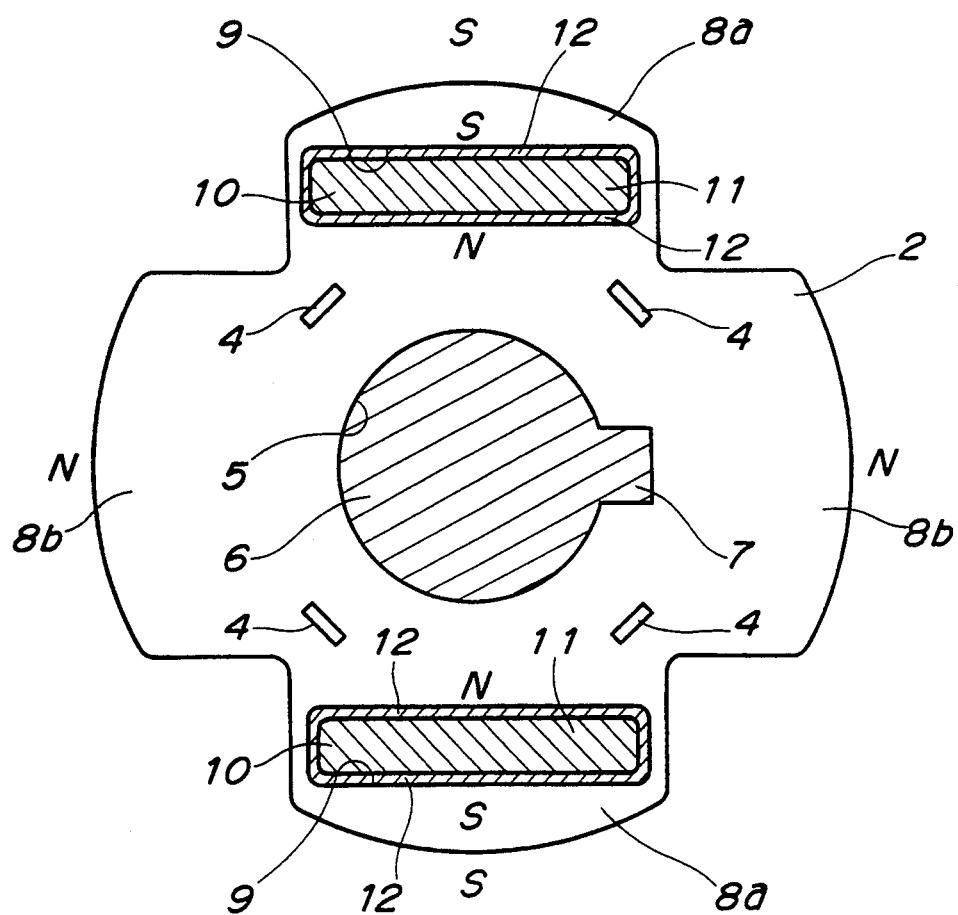
FIG. 2 is a sectional view of the permanent magnet rotor shown in FIG. 1.

FIG. 2 shows the permanent magnetic rotor 1 in a crosssection. As shown, the permanent magnet rotor 1 includes a pair of permanent magnets 10 each comprising a cast type permanent magnet core 11 and an anticorrosion plate 12 wound around the former. The anticorrosion plate 12 is made of metallic sheet having an ability to resist severe temperature and corrosive attack of refrigerant with which the plate 12 is to be in contact (referred to hereinafter as corrosion resistance) and is integrally wound around the cast type permanent magnet core 11.

The permanent magnet 10 is protectively covered with the anticorrosion plate 12 and therefore will be free from corrosion even if the permanent magnet rotor 1 is used directly in a severe environment where refrigerant may permeate through the interstices of the laminated silicon steel sheets 2 and comes in direct contact with the permanent magnets 10. In this manner, separation of magnetic particles from the permanent magnets 10 due to corrosion and clogging of various equipment parts with such magnetic particles are effectively avoided. Demagnetization due to corrosion of the permanent magnets is also avoided.

Figure 3:
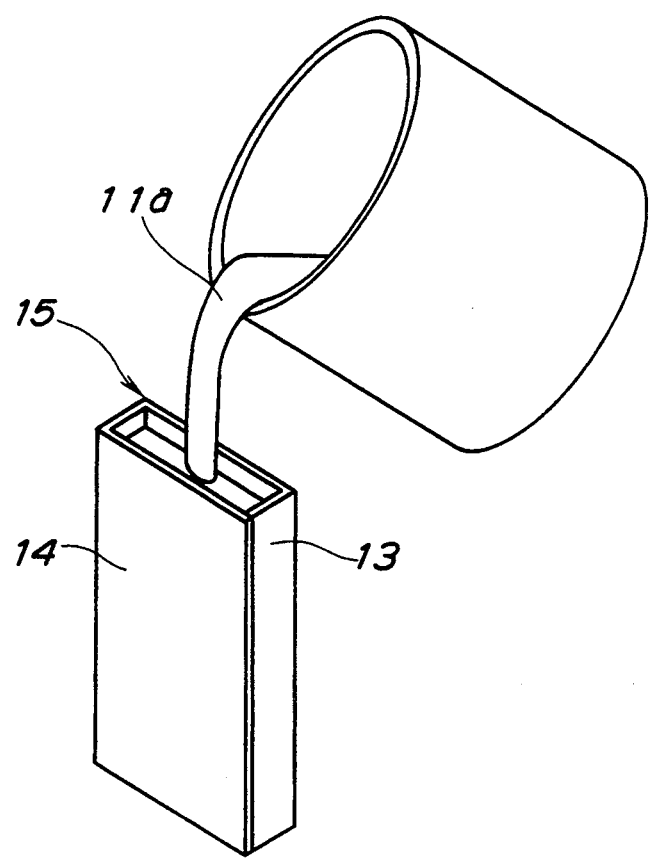
FIG. 3 is a perspective view sketching a first manufacturing process of the permanent magnet used in the rotor of FIGS. 1 and 2.

Referring to FIG. 3. the first manufacturing process for the permanent magnets 10 is illustrated. As illustrated, the corrosion resisting metallic sheet 13 is bent and opposite free edges thereof are welded together so as to form a peripheral wall of a mold 14 having a rectangular cross-section, Bottom of the mold 14 is sealed by a suitable member. Molten metal 11a of the cast type permanent magnet such as praseodymium alloy is poured into the mold 14 and thereby a permanent magnet ingot 15 is molded.

Figure 4:
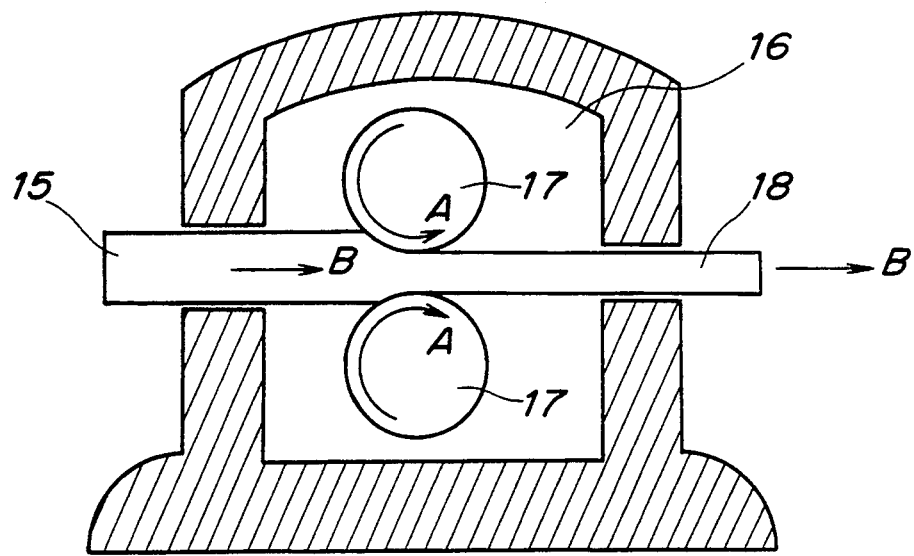
FIG. 4 is a schematic diagram illustrating a second manufacturing process of the permanent magnet.

Referring to FIG. 4, the second manufacturing process for the permanent magnet 10 is illustrated. The permanent magnet ingot 15 molded in the manner as has been mentioned above is then inserted into a hot working chamber 16 maintained at a predetermined temperature and therein hot rolled by a rolling mill 17 while the ingot 15 is magnetically made anisotropic under effect of an intense magnetic field. The permanent magnet ingot 15 is moved in the direction indicated by an arrow B and rolled into an elongate rolled bar 18 of permanent magnet having a predetermined cross-sectional dimension as the rolling mill 17 is rotated in a direction indicatect by an arrow A.

The rolled bar 18 of permanent magnet thus obtained then cut transversely of its axis by a cutting-off wheel into the individual permanent magnets 10 each of a predetermined dimension.

The permanent magnets 10 are inserted into the respective slots 9 of the yoke 3 and axially opposite surfaces of each magnet 10 are coated with anticorrosive resinous material. The rotatable shaft 6 is inserted into the axial opening of the yoke 3 so as to complete the permanent magnet rotor 1.

According to the above-mentioned manufacturing method, productivity of the permanent magnets 10 can be improved, since it is unnecessary to wrap the individual permanent magnets 10 with the individual anticorrosion plates 12 and to weld opposite free edges of the individual anticorrosion plates 12. In addition, the permanent magnets 10 can be inserted into the respective slots 9 of the yoke 3 without a risk of damage, since the permanent magnets 10 are inserted into the yoke 3 together with the anticorrosion plates 12 protectively wrapping the respective magnets 10. This provides an easy and highly productive method of making the permanent magnet rotor.

While the invention has been described above in connection with the specific embodiment of permanent magnets which have their magnetic poles of a same polarity being diametrically opposed to each other and mutual repulsion of these magnetic poles generates the magnetic poles the number of which is twice the number of permanent magnets along the outer periphery of the permanent magnet rotor, the invention is not limited to the permanent magnet rotor of such construction but applicable also to the conventional permanent magnet rotor wherein the same number of permanent magnets as the number of magnetic poles are inserted into the yore.

While the invention has been described also above in the connection with the specific embodiment of permanent magnet rotor so constructed that the permanent magnets are inserted into the slots of the yoke comprising a plurality of integrally laminated silicon steel sheets, the invention is not limited to such a rotor but applicable also to the permanent magnet rotor so constructed that the permanent magnets are bonded onto the outer periphery of a pillar-shaped yoke.

According to the first aspect of the invention, as will be apparent from the foregoing description, the permanent magnet rotor can be used in corrosive atmosphere or liquid such as refrigerant without a risk that the permanent magnets might be corroded thereby since the outer peripheries of the respective permanent magnets are hermetically covered with the anticorrosion plates and perfectly isolated from said atmosphere or liquid. In addition to protecting the permanent magnet core against corrosion, the anticorrosion plate prevents the permanent magnet from being damaged during assembly of the permanent magnet rotor.

With the method of making the permanent magnet rotor according to the invention. The manufacturing processes are substantially simplified with respect to the conventional method by which the anticorrosion plates such as metallic sheets are directly wound around the individual permanent magnets. Since, according to the invention, each anticorrosion plate is used as a part of the mold into which molten metal of the cast type permanent magnet is poured to mold the permanent magnet ingot, then the permanent magnet ingot thus formed is hot rolled into the rolled bar while said ingot is magnetically made anisotropic, and finally this rolled bar is cut into a plurality of individual permanent magnets each of a predetermined length. More specifically, the processes of winding the anticorrosion plates around the individual permanent magnets and welding or bonding opposite free edges of each anticorrosion plates thus would around the permanent magnet can be eliminated, and a number of permanent magnets can be obtained at once with a high productivity.

Now, a second embodiment of the invention will be described with reference to FIGS. 5 through 7.

According to this embodiment, the yoke and the permanent magnets of the rotor are hermetically covered with thin sheets of anticorrosive material so that the permanent magnet rotor may be used in the corrosive atmosphere or liquid. Such construction allows both the yoke and the permanent magnets to be perfectly isolated from the external atmosphere or liquid and thereby allows the permanent magnet rotor to be used in said corrosive atmosphere or liquid, for example, in refrigerant without a risk that the yoke and the permanent magnets might be thereby corroded.

Figure 5:
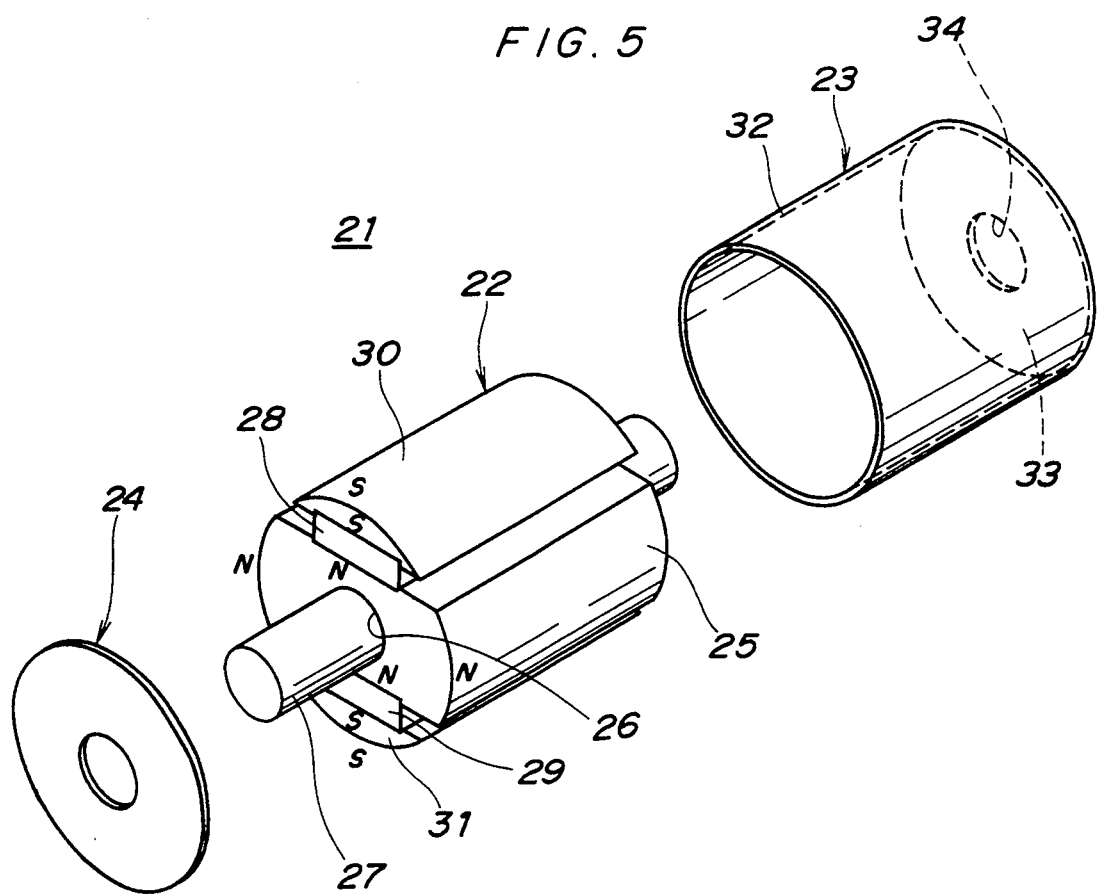
FIG. 5 is an exploded perspective view showing an alternative embodiment of the permanent magnet rotor constructed in accordance with the invention.

Referring to FIG. 5. a permanent magnet rotor 21 comprises a permanent magnet, rotor proper 22, a metallic casing 23 covering the outer peripheral surface and one axial end surface of a pillar-shaped assembly of a yoke and permanent magnets constituting the permanent magnet rotor proper 22, and a flat, circular molded member 24 adapted to cover the other axial end surface of the pillar-shaped assembly.

The permanent magnet rotor proper 22 centrally includes the yoke 25 which is, in turn, centrally provided with an opening 26 serving to receive a rotatable shaft 27. The rotatable shaft 27 has a locking key or the like (not shown) by means of which the rotatable shaft. 27 can be rotated integrally with the yoke 25. The yoke 25 has an outer periphery configured to comprise a pair of cylindrical surface sections and a pair of flat surfaces which are mutually parallel and opposed to each other. A pair of bar-shaped permanent magnets 28, 29 are bonded onto the parallel flat surfaces of the yoke 25, respectively, with their magnetic poles of a same polarity being opposed to each other. The surfaces of these permanent magnets 28, 29 not opposed to each other respectively carry auxiliary yokes 30, 31 bonded thereto, respectively, serving to form magnetic poles.

Assumed that the permanent magnets 28, 29 are arranged on the mutually parallel surfaces of the yoke 25 with their N-poles being opposed to each other, mutual repulsion of these magnetic poles causes the outer peripheral sections of the outer surfaces of the auxiliary yokes 30, 31 to be magnetized in S-polarity. Consequently, the permanent magnet rotor 21 has along the outer periphery four magnetic poles and is rotationally driven by interaction with excitation coils (not shown) of the motor.

The metallic casing 23 comprises a cylindrical portion 32 serving to cover the outer periphery of the pillar-shaped assembly consisting of the yoke 25, the permanent magnets 28, 29 and the auxiliary yokes 30, 31 and a bottom 33 serving to cover the one axial end surface of the pillar-shaped assembly. The bottom 33 is centrally provided with an opening 34 serving to receive the rotatable shall 27. The metallic casing 23 of a deep bowl shape is formed by well known deep drawing process in which a central zone of a metal sheet is forced by a punch of a predetermined configuration into a die cavity so as to form a metallic container having a cylindrical side wall and a bottom wall which is then provided with an opening. Starting metal sheet material for the metallic casing 23 should have a resisting property (referred to hereinafter as corrosion resistance) to the severe temperature and/or corrosiveness of the particular type of refrigerant being used. Such corrosion resisting metallic material includes various kinds of metal sheets such as a stainless steel sheet and the other anticorrosive metal sheets.

Figure 6:
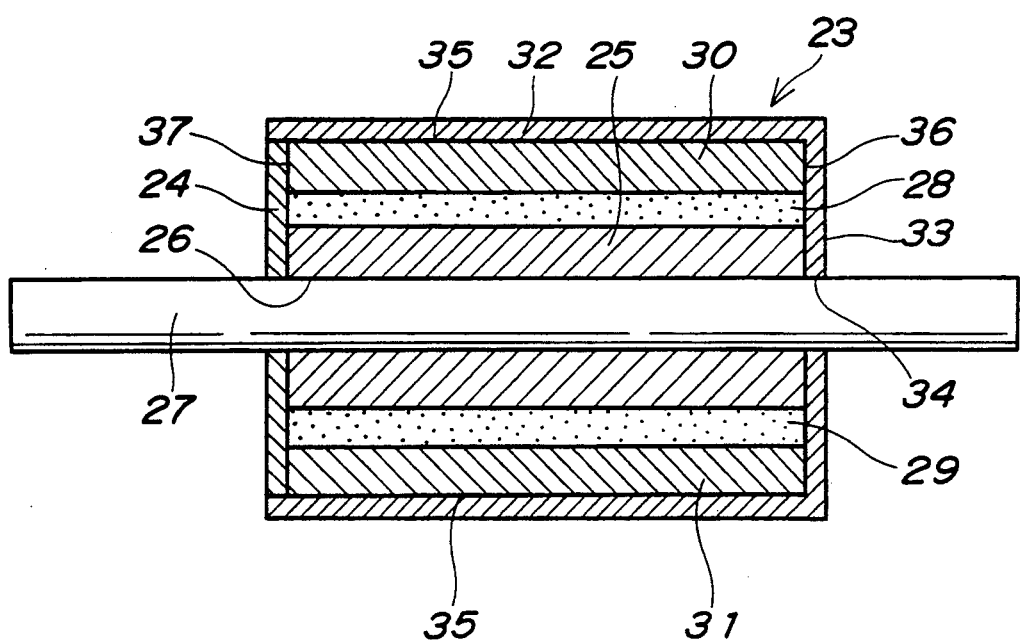
FIG. 6 is a sectional side view of the permanent magnet. rotor shown in FIG. 5.
Figure 7:
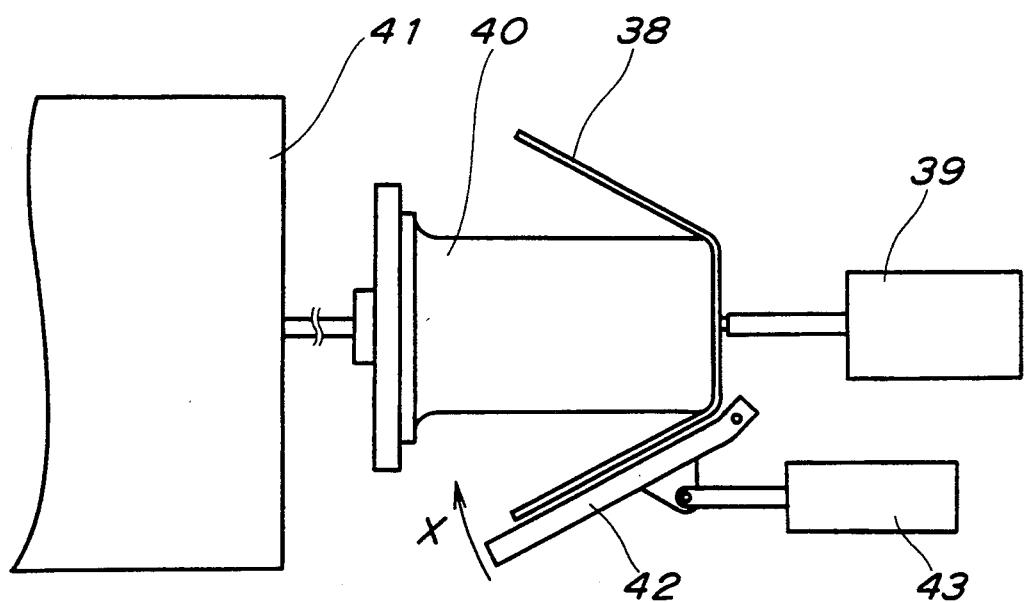
FIG. 7 is a schematic diagram illustrating a spinning process for a metallic casing.
Figure 8:
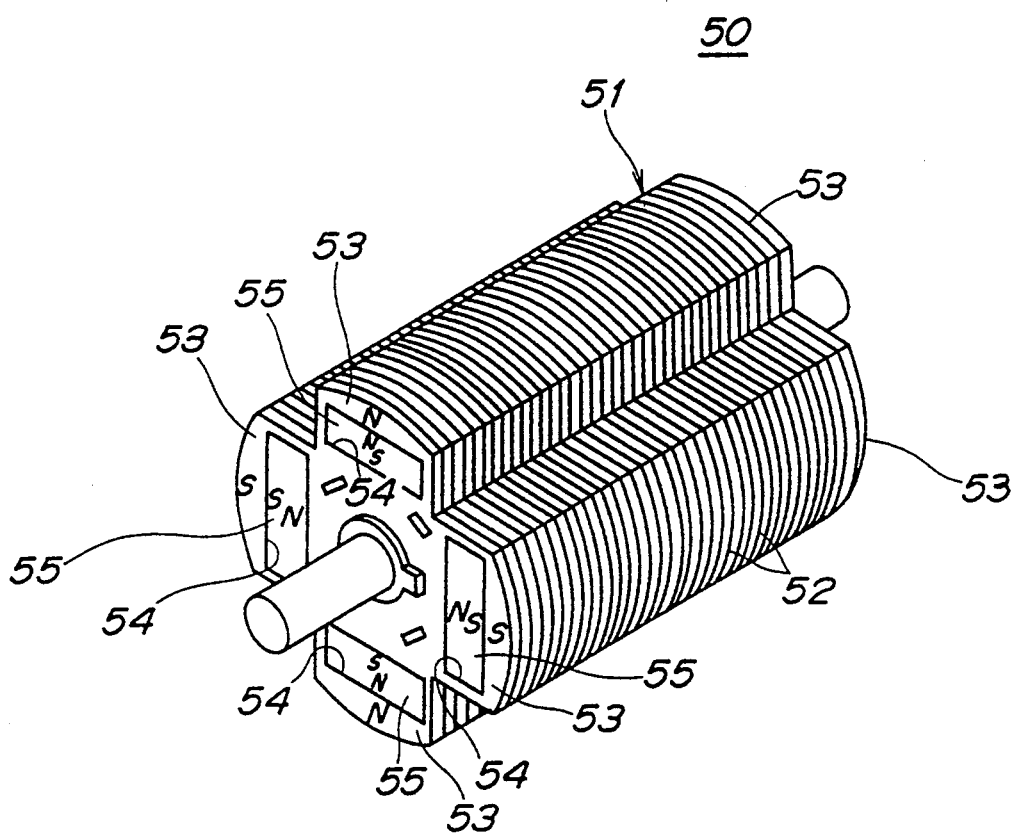
FIG. 8 is a perspective view sketching a permanent magnet rotor of prior art.
Figure 9:
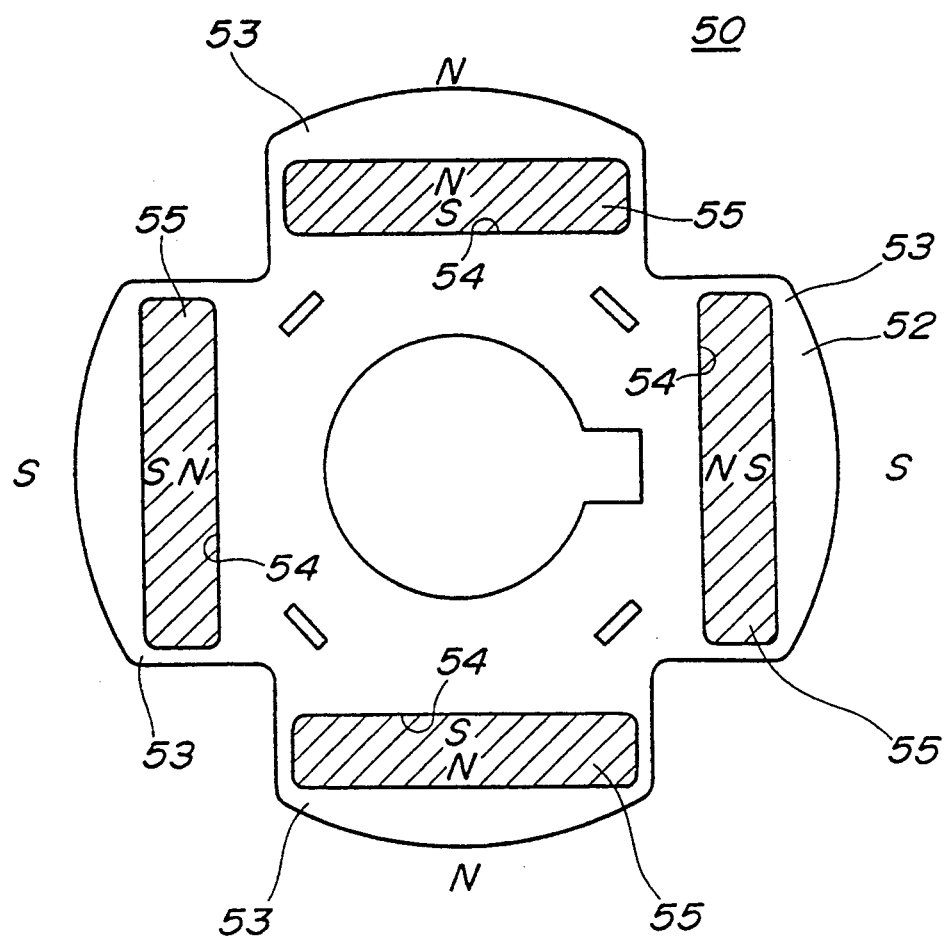
FIG. 9 is a sectional view of the permanent magnet rotor shown in FIG. 8.

Referring to FIG. 6, the assembled permanent magnet rotor is shown in an axial sectional view, in which the permanent magnet rotor proper 22 has been inserted into the metallic casing 23. The outer peripheral surface 35 of said pillar-shaped assembly comprising the yoke 25, the permanent magnets 28, 29 and the auxiliary yokes 30, 31 is covered with the cylindrical portion 32 of the metallic casing 23 and the one axial end surface 26 is covered with the bottom wall 33 of the metallic casing 23. A joint between the opening 34 formed in the bottom wall 33 of the metallic casing 23 and the rotatable shaft 27 is sealed by use of resinous material or welding process.

An open end of the metallic casing's cylindrical portion 32 projects slightly beyond an end surface of the pillar-shaped assembly comprising the yoke 25, the auxiliary yokes 30, 31 and the permanent magnets 28, 29. The molded member 24 comprising a corrosion resisting resinous molded member or an aluminum die case is tightly fitted into a recess defined by the end surface 37 and the cylindrical portion 32 of the metallic casing 23. Both a joint between the molded member 24 and the rotatable shaft 27 and a joint between the molded member 24 and the cylindrical portion 32 of the metallic casing 23 are sealed by use of resinous adhesive or welding process. With the construction as has been described above. The yoke 25, the permanent magnets 28, 29 and the auxiliary yokes 30, 31 constituting together the permanent magnet rotor proper 22 is perfectly isolated from the exterior and therefore the permanent magnet rotor 21 can be used even in the corrosive atmosphere or liquid without a risk that the refrigerant might come into direct contact with the yoke and the permanent magnets and corrode them. Additionally, the cylindrical portion 32 of the metallic casing 23 effectively prevents the permanent magnets 28, 29 from centrifugally flying off.

The metallic casing 23 can be molded also by spinning instead of the above-mentioned deep drawing. FIG. 7 illustrates one process in the course of molding the metallic casing by means of the spinning. As seen, the metal sheet 38 is secured at its central zone by a fastener 39 to a mold 40 and rotated by a motor 41. Adjacent the mold 40 there is provided a pallet 42 so as to be swingable around one end thereof. The pallet 42 is swung by a pallet driver 43 in the direction X as indicated by an arrow, pressing the metal sheet 38 against its outer periphery of the mold 40 to form a metallic container having a cylindrical side wall and a bottom wall. The bottom wall of this metallic container is formed with an opening and thereby the complete metalic casing 23 is obtained.

Formation of the metallic casing 23 by the above-mentioned deep drawing or spinning process advantageously allows the conventionally required processes of winding the metal sheet around the permanent magnet rotor and then welding the opposite free edge of the metal sheet to be eliminated, thus improving a productivity with which the permanent magnet rotor can be manufactured.

While the invention has been described above in connection with the specific embodiment of permanent magnet rotor so constructed that the permanent magnets are arranged with their magnetic poles of a same polarity being opposed to each other and mutual repulsion of these magnetic poles generates along the outer periphery of the permanent magnetic rotor the magnetic poles the number of which is twice the number of permanent magnets, the invention is not limited to such construction of permanent magnet rotor but applicable also to any other construction of permanent magnet rotor.

As will be appreciated from the foregoing description, the second embodiment of permanent magnet, rotor can be used in the corrosive atmosphere or liquid, for example, in refrigerant, since the outer periphery of the yoke and the permanent magnets is hertactically covered with the anticorrosive sheet material.

Furthermore, by hermetically covering both the yoke and the magnets with the metallic casing formed by the deep drawing or spinning process, this embodiment advantageously allows the conventionally required process of welding to be eliminated and provides the permanent magnet rotor which can be easily manufactured and free from a risk that the refrigerant or the like might permeate through the seam of the metallic casing.

Industrial Usefulness

As will be appreciated from the foregoing description, the rotor for the brushless motor constructed according to the invention is suitable for the motor such as the motor for scroll type compressor which is usually used in the corrosive atmosphere or liquid, particularly in refrigerant.

We claim:

1. A corrosion resistant rotor with auxiliary yokes for a brushless motor, comprising:
    a rotatable shaft;
    a main yoke surrounding said rotatable shaft and having at least one pair of flat surfaces and at least one pair of curved surfaces, said flat and curved surfaces being arranged alternately;
    at least one pair of permanent magnets provided on said flat surfaces;
    at least one pair of auxiliary yokes provided on said permanent magnets to form a rotor proper together with said main yoke and permanent magnets;
    a metallic case made from a corrosion resistant material in a form of deep bowl having a cylindrical portion for covering a circumferential surface of said rotor proper and a circular portion for covering an end surface of said rotor proper; and
    a circular molding provided on another end surface of said rotor proper;
    said rotatable shaft extending through and hermetically sealed to said circular portion of said metallic case and said circular molding.

2. The corrosion resistant rotor with auxiliary yokes of claim 1, wherein said cylindrical portion extends from an end of said rotor proper to an extend equal to a thickness of said circular molding to thereby form a circular recess in which said circular molding is fitted.

* * * * *